United States Patent
McCarthy et al.

(10) Patent No.: US 10,865,591 B2
(45) Date of Patent: Dec. 15, 2020

(54) EMERGENCY RELEASE SYSTEM FOR AUTOMOBILE SIDE DOOR

(71) Applicant: Faraday & Future Inc., Gardena, CA (US)

(72) Inventors: Chris McCarthy, Tracy, CA (US); Cian John Francis Brogan, Los Angeles, CA (US)

(73) Assignee: FARADAY & FUTURE INC., Gardena, CA (US)

(*) Notice: Subject to any disclaimer, the term of this patent is extended or adjusted under 35 U.S.C. 154(b) by 466 days.

(21) Appl. No.: 15/596,398

(22) Filed: May 16, 2017

(65) Prior Publication Data
US 2018/0038140 A1   Feb. 8, 2018

Related U.S. Application Data

(60) Provisional application No. 62/337,113, filed on May 16, 2016.

(51) Int. Cl.
| | | |
|---|---|---|
| *E05B 81/90* | (2014.01) | |
| *B60J 5/04* | (2006.01) | |
| *E05B 81/20* | (2014.01) | |
| *E05B 79/20* | (2014.01) | |

(52) U.S. Cl.
CPC .............. *E05B 81/90* (2013.01); *B60J 5/0413* (2013.01); *E05B 79/20* (2013.01); *E05B 81/20* (2013.01)

(58) Field of Classification Search
CPC .......... E05B 79/20; E05B 81/90; E05B 83/26; E05B 77/26; E05B 85/10; E05B 65/10; E05Y 2201/244; E05Y 2600/12
See application file for complete search history.

(56) References Cited

U.S. PATENT DOCUMENTS

| | | | | |
|---|---|---|---|---|
| 2,254,419 | A * | 9/1941 | Castle ..................... | E05B 77/46 180/289 |
| 2,873,135 | A * | 2/1959 | Haltenberger .......... | E05B 77/12 292/280 |
| 5,005,885 | A * | 4/1991 | Kobayashi .............. | E05B 85/12 292/336.3 |
| 5,676,003 | A * | 10/1997 | Ursel ..................... | E05B 77/26 292/201 |
| 2002/0063432 | A1* | 5/2002 | Choi ....................... | E05B 83/16 292/336.3 |
| 2004/0154225 | A1* | 8/2004 | Sanke ................. | E05B 65/0021 49/141 |
| 2006/0028031 | A1* | 2/2006 | Tibbenham ............. | B60R 11/00 292/336.3 |
| 2007/0216170 | A1* | 9/2007 | Drescher ................. | E05B 83/16 292/201 |
| 2011/0101709 | A1* | 5/2011 | Katsumata .............. | E05B 81/14 292/201 |
| 2011/0132047 | A1* | 6/2011 | Terhaar ................... | E05B 17/04 70/91 |

(Continued)

*Primary Examiner* — Mark A Williams
(74) *Attorney, Agent, or Firm* — Veros Legal Solutions, LLP

(57) ABSTRACT

An emergency release system is disclosed for use with a side door of an automobile. The emergency release system may include a latch, a cable, and a handle connected to the latch via the cable. The handle may be pivotal through a first range to a stop, translatable to surmount the stop, and pivotal through a second range after surmounting the stop to release the latch.

10 Claims, 4 Drawing Sheets

(56) References Cited

U.S. PATENT DOCUMENTS

| | | | |
|---|---|---|---|
| 2011/0289850 A1* | 12/2011 | Helms | B60J 1/085 49/141 |
| 2012/0032457 A1* | 2/2012 | Ishikawa | E05B 17/106 292/336.3 |
| 2012/0161453 A1* | 6/2012 | Zysk | E05B 83/24 292/21 |
| 2013/0238187 A1* | 9/2013 | Zysk | E05B 81/56 701/36 |
| 2015/0197964 A1* | 7/2015 | Kouzuma | E05B 81/34 292/336.3 |
| 2016/0010365 A1* | 1/2016 | Hanaki | E05B 81/14 292/21 |
| 2016/0201361 A1* | 7/2016 | Hanaki | E05B 81/16 292/200 |
| 2018/0038140 A1* | 2/2018 | McCarthy | E05B 81/90 |

* cited by examiner

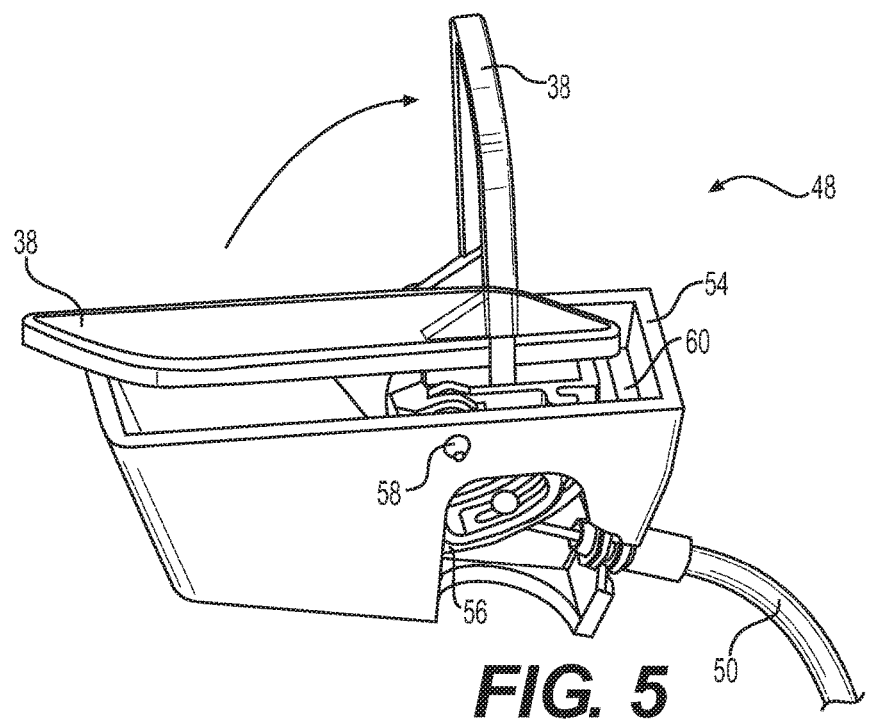
FIG. 5
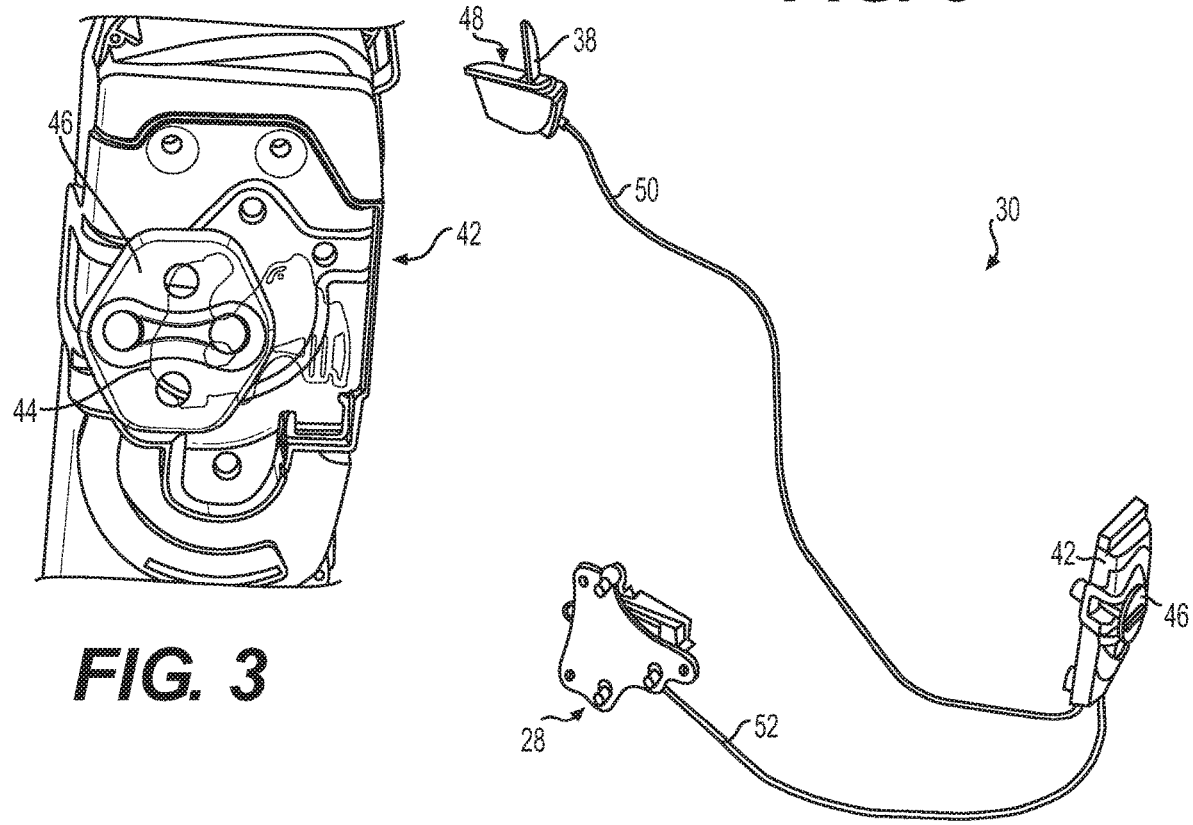
FIG. 3
FIG. 4

EMERGENCY RELEASE SYSTEM FOR AUTOMOBILE SIDE DOOR

CROSS-REFERENCE TO RELATED APPLICATIONS

This application claims the benefit of U.S. Provisional Application No. 62/337,113, filed May 16, 2016, the entirety of which is hereby incorporated by reference.

TECHNICAL FIELD

The present disclosure relates generally to an emergency release system, and more particularly, to an emergency release system for an automobile side door.

BACKGROUND

Automobiles (e.g., passenger cars, trucks, vans, busses, etc.) have side doors that pivot on hinges to allow passengers to enter and exit. A conventional side door is equipped with a mechanical handle that, when actuated, opens a latch holding the door closed. The door may then be pulled or pushed open.

A recent trend in automobile technology includes the use of a power side door, which automatically opens and closes at the touch of the driver or passenger. A mechanically actuated handle is not required or provided in these designs. Although the power side door may be aesthetically pleasing and an ease-of-use improvement over the conventional side door, problems could arise when electrical power supplied to the side door is disrupted. Specifically, the power side door may not function (e.g., not open) without electrical power, giving rise to the possibility of a passenger being locked in or locked out of the automobile.

The disclosed emergency release system is directed to mitigating or overcoming one or more of the problems set forth above and/or other problems in the prior art.

SUMMARY

One aspect of the present disclosure is directed to an emergency release for a side door of an automobile. The emergency release may include a latch, a cable, and a handle connected to the latch via the cable. The handle may be pivotal through a first range to a stop, translatable to surmount the stop, and pivotal through a second range after surmounting the stop to release the latch.

Another aspect of the present disclosure is directed to a side door for an automobile. The side door may include a door panel having an upper surface adjacent a window, and a hinge located at a first end of the door panel. The side door may also include a latch located at a second end of the door panel, a cable, and a handle mounted to the upper surface of the door panel and connected to the latch via the cable. The handle may be pivotal through a first range to a stop, translatable to surmount the stop, and pivotal through a second range after surmounting the stop to release the latch Yet another aspect of the present disclosure is directed to an automobile. The automobile may include a body defining a front seat opening and a rear seat opening, a front-side door pivotally connected at a leading end to close off the front seat opening, and a rear-side door pivotally connected at a trailing end to close off the rear seat opening. The automobile may also include a first electrically powered actuator touchable to initiate unlocking of the front-side door, a second electrically powered actuator touchable to initiate unlocking of the rear-side door, and an emergency release system associated with only the front-side door. The emergency release system may include a latch located at a trailing end of the front-side door, a cable, and a handle mounted to the leading end of the front-side door and connected to the latch via the cable. The handle may be pivotal through a first range to a stop, translatable to surmount the stop, and pivotal through a second range after surmounting the stop to release the latch.

BRIEF DESCRIPTION OF THE DRAWINGS

FIG. 3 is a perspective illustration of an exemplary disclosed latch that may form a portion of the doors of FIG. 2.

FIG. 4 is a diagrammatic illustration of an exemplary disclosed emergency release system that may be used to unlock the latch of FIG. 3.

FIG. 5 is perspective illustration of an exemplary disclosed action that forms a portion of the emergency release system of FIG. 4.

DETAILED DESCRIPTION

The disclosure is generally directed to a system that may be used to open a powered side door of an automobile during an electrical power disruption or other similar malfunction (e.g., network and/or component failure). The system may allow for mechanical unlatching of the door in the absence of electrical power. The system may be robust and employ a unique three-step unlatching process.

Figure 1:
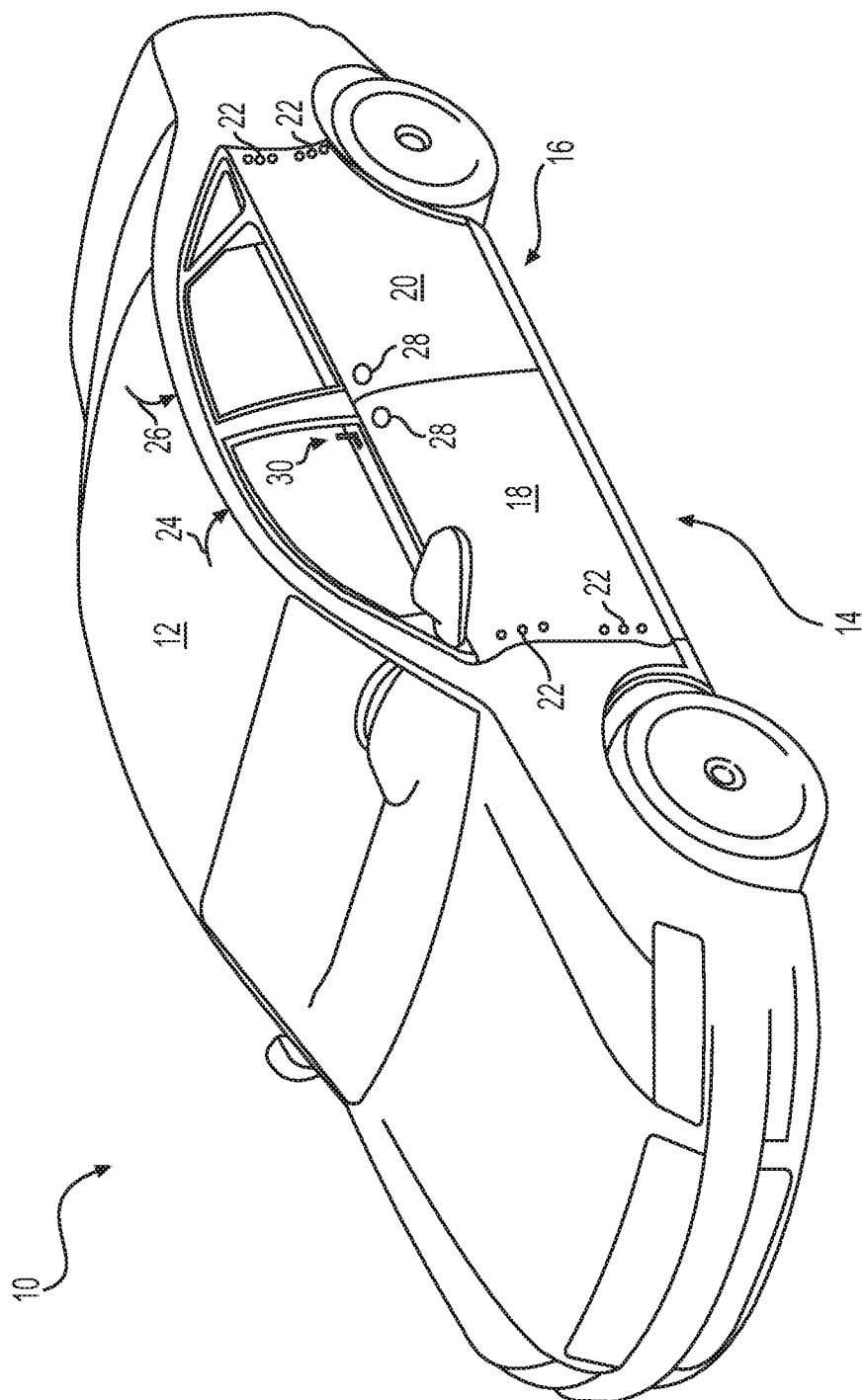
FIG. 1 is a perspective view illustration of an exemplary disclosed automobile.

FIG. 1 is a perspective view illustration of an exemplary automobile 10. Although automobile 10 is shown as a car in FIG. 1, it is contemplated that automobile 10 may alternatively be a pickup truck, a utility vehicle, a van, or another type of motorized vehicle. Automobile 10, as is known in the art, may include a body 12 at least partially defining a front-seat opening 14 and a rear-seat opening 16 at each lateral side thereof. A front-side door 18 may be pivotally connected to each lateral side of body 12 to close off front-seat opening 14. Similarly, a rear-side door 20 may be pivotally connected to each lateral side of body 12 to close off rear-seat opening 16. It is contemplated that automobile 10 could have only a single opening (e.g., only front-seat opening 14) at one or both lateral sides thereof, if desired.

In one embodiment, automobile 10 may be provided with a rear-swing door configuration. In particular, front-side door 18 may include one or more hinges 22 located at a leading end, such that front-side door 18 may pivot open in a direction represented by an arrow 24. In this same configuration, rear-side door 20 may include one or more hinges 22 located at a trailing end, such that rear-side door 20 may pivot open in a direction represented by an arrow 26. It is contemplated, however, that in other embodiments, automobile 10 may have a conventional door configuration (e.g., a configuration where both front- and rear-side doors 18, 20 have hinges 22 located at only leading ends).

Front- and rear-side doors 18, 20 may both be electrically powered. In particular, an electrically powered actuator 28 may be provided for each of front- and rear-side doors 18, 20. As will be explained in more detail below, when a portion of actuator 28 is touched or otherwise activated by a human operator, the corresponding door may be unlocked, thereby allowing the door to be pulled or pushed open. In some embodiments, in addition to being unlocked in response to the passenger's touch, one or more of the doors may also be automatically opened or closed.

One or more of front- and rear-side doors 18, 20 may be provided with an emergency release system 30 for use during electrical power disruption. Emergency release system 30 may allow for mechanical opening of the corresponding door when the door cannot be electrically unlocked. In the rear-swing door configuration shown in FIG. 1, only front-side door 18 is provided with emergency release system 30. By providing only front-side door 18 with emergency release system 30, the risk of a rear-seat passenger unintentionally opening rear-side door 20 while automobile 10 is traveling (and thereby causing damage to automobile 10 and/or generating a safety concern) may be reduced. It is contemplated, however, that both front- and rear-side doors 18, 20 could be provided with emergency release system 30 (see FIG. 2), if desired.

Figure 2:
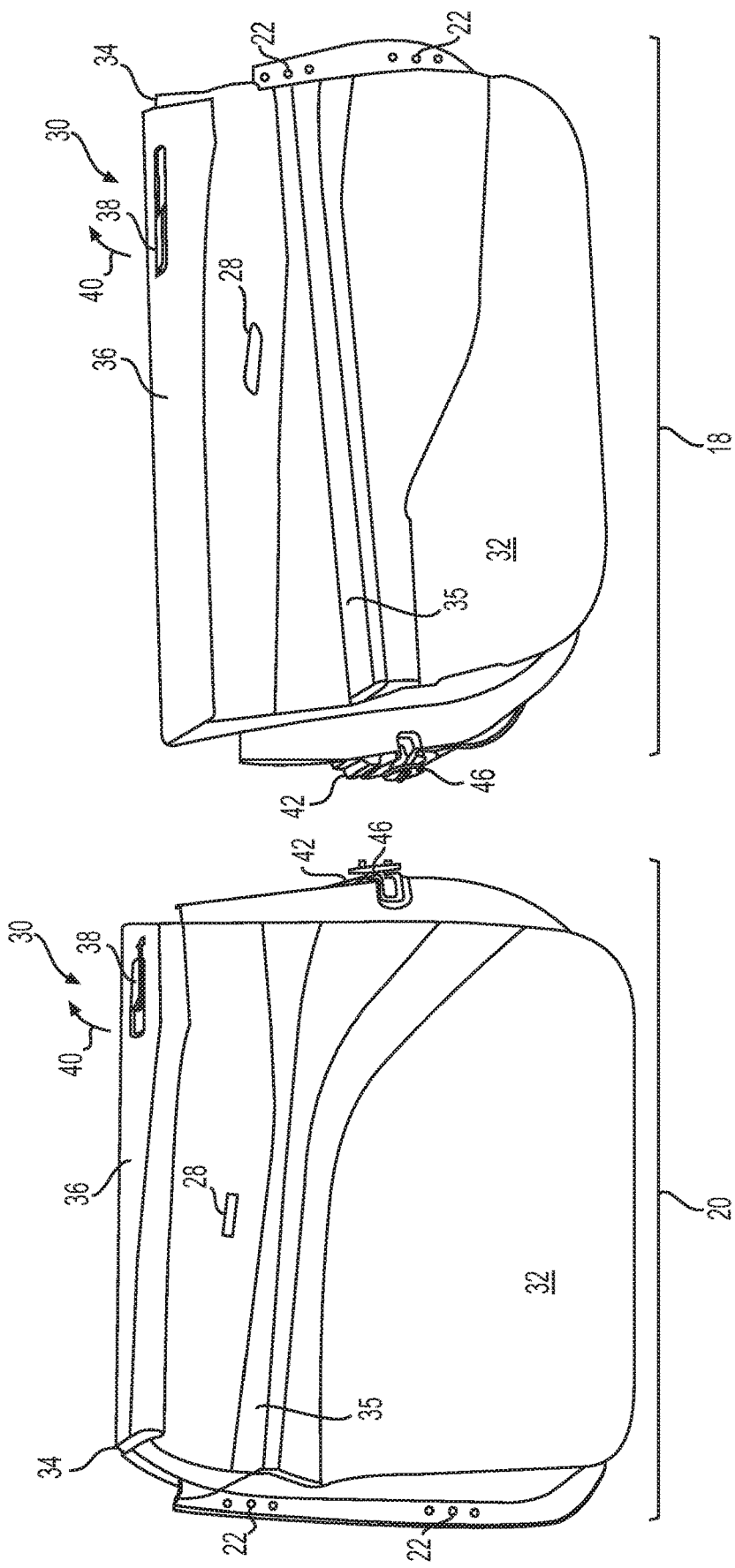
FIG. 2 is a perspective illustration of exemplary disclosed doors that may be used in conjunction with the automobile of FIG. 1.

As shown in FIG. 2, each of front- and rear-side doors 18, 20 may include an interior panel 32, and a window 34 that is selectively retracted down into panel 32. Panel 32 may have many different shapes, sizes, contours, and configurations. Regardless of the different shapes, sizes, contours, and configurations, panel 32 may have at least one upper surface 36. In most configurations, upper surface 36 is generally flat and generally horizontal. In some embodiments, door panel 32 may additionally include an arm rest 35. In these embodiments, upper surface 36 is located gravitationally above arm rest 35. In some instances, upper surface 36 may be generally parallel with arm rest 35.

A portion of emergency release system 30 may be connected to upper surface 36 of each of front- and rear-side doors 18, 20. For example, a handle 38 of emergency release system 30 is shown in FIG. 2 as being at least partially recessed within upper surface 36. Handle 38 may be located adjacent window 34 at a leading end of each panel 32. In this configuration, handle 38 may be visible and accessible from outside of automobile 10 (e.g., through window 34). This configuration may allow a public safety technician (e.g., a police officer, an EMT, a paramedic, a fireman, etc.) to open the corresponding door using emergency release system 30 by way of window 34. As will be explained in more detail below, handle 38 may pivot forward toward the leading end of panel 32 in a direction represented by an arrow 40 during activation of emergency release system 30.

In some embodiments, actuator 28 described above may also be accessible from inside of automobile 10. In these embodiments, a touchable portion of actuator 28 may also be connected (e.g., embedded within) panel 32. For example, actuator 28 may be located within a generally vertical portion of panel 32 at a location gravitationally below upper surface 36 and rearward of handle 38. With this configuration, actuator 28 may be easily reachable by a passenger of automobile 10 while the passenger is comfortably seated. In contrast, the passenger may have to lean and/or reach forward and upward in order to reach and activate handle 38. This may reduce a likelihood of inadvertently activating handle 38.

When either actuator 28 or handle 38 is activated by the passenger of automobile 10, a corresponding latch 42 may be unlocked. Latch 42 may be connected to an end of each of front- and rear-side doors 18, 20 (e.g., opposite hinge 22). As shown in FIG. 3, latch 42 may include a lever 44 that is configured to engage a corresponding striker 46 connected to body 12 (e.g., to a door post located between front- and rear-seat openings 14, 16—not shown). As is known in the art, lever 44 may be spring-biased toward striker 46, and selectively held in place by a separate locking pawl (not shown). Activation of actuator 28 or handle 38 may result in the pawl being moved away from lever 44, thereby allowing the passenger to push or pull the corresponding door and disengage lever 44 from striker 46. In some examples, actuator 28 may further function to move the latch from a secondary position (i.e., when the door is latched, but not closed completely) to a primary position (i.e., when the door is completely closed).

A diagram of an exemplary emergency release system 30 is illustrated in FIG. 4. As can be seen in FIG. 4, handle 38 may be included within an action 48 of emergency release system 30. Handle 38 may be connected to a cable 50, which extends between action 48 and latch 42. FIG. 4 also illustrates a mechanical connection 52 (e.g., a cable), which extends between actuator 28 and latch 42. Connection 52 may function in parallel with cable 50 to cause the unlocking of lever 44 described above. Cable 50 and connection 52 may be housed inside of panel 32.

As shown in FIG. 5, action 48 may be an assembly of components that cooperate to pull on cable 50 and thereby unlock latch 42 as handle 38 is manually activated. These components may include, among other things, a housing 54, a cam 56, and a pivot pin 58. Handle 38 and cam 56 may both be disposed within housing 54 and rotatably supported by pivot pin 58. Many different designs of cam 56 may be possible. For example, in some embodiments, cam 56 and handle 38 are separate components. In other embodiments, however, cam 56 could be an integral portion of handle 38, if desired. Regardless of the particular design, cam 56 may be configured to pull cable 50 as it is rotated about pivot pin 58.

In some embodiments, action 48 may have a designed failure mode. In particular, action 48 may be designed such that, if excessive forces are applied to handle 38 (e.g., a force exceeding a predetermined threshold force), handle 38 may break away from housing 54 while still attached to cable 50 (e.g., directly or by way of cam 56). For example, pivot pin 58 may be designed to have a lower strength than handle 38 and/or cam 56. In this manner, pivot pin 58 may fail before failure of handle 38 and cam 56, allowing cable 50 to remain attached to handle 38 and/or cam 56. In another example, a portion of handle 38 and/or cam 56 that engages pivot pin 58 may be designed as a weak point. By ensuring that cable 50 remains connected to handle 38 and/or cam 56 even after a failure of emergency release system 30, the ability to still open the corresponding door may remain intact.

As handle 38 and/or cam 56 are rotated about pivot pin 58 during activation of emergency release system 30, a stop 60 may be engaged that inhibits further rotation. Stop 60 may be formed, for example, inside of housing 54. Stop 60 may be used to inhibit unintentional activation of emergency release system 30. That is, as will be explained below, deliberate action must be taken after engagement of stop 60 in order to continue activation of emergency release system 30. In some embodiments, a spring may be included and used to bias handle 38 toward a deactivated position. For example, the spring may extend between housing 54 and handle 38 and/or between housing 54 and cam 56. Alternatively, the spring may be associated with latch 42 and configured to act on handle 38 remotely (e.g., through cable 50). Other spring configurations may also be possible.

Figure 6:
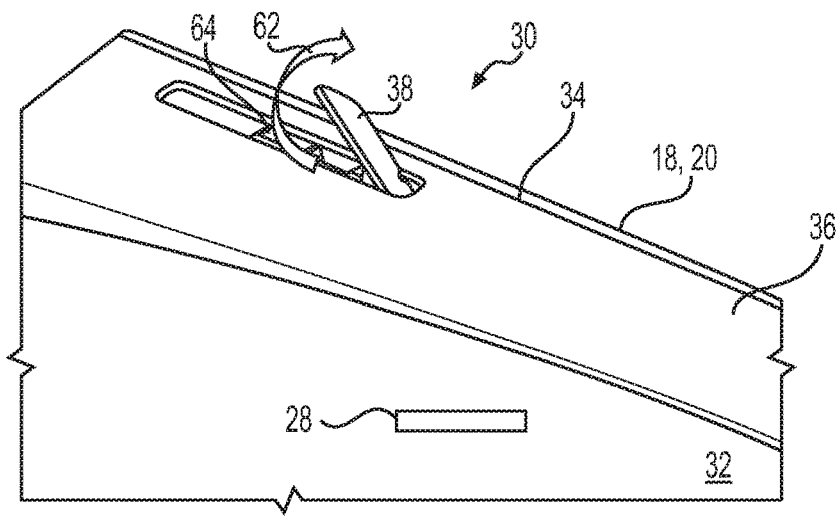
FIGS. 6-8 are perspective illustrations of exemplary steps for activating the emergency release system of FIG. 4.
Figure 7:
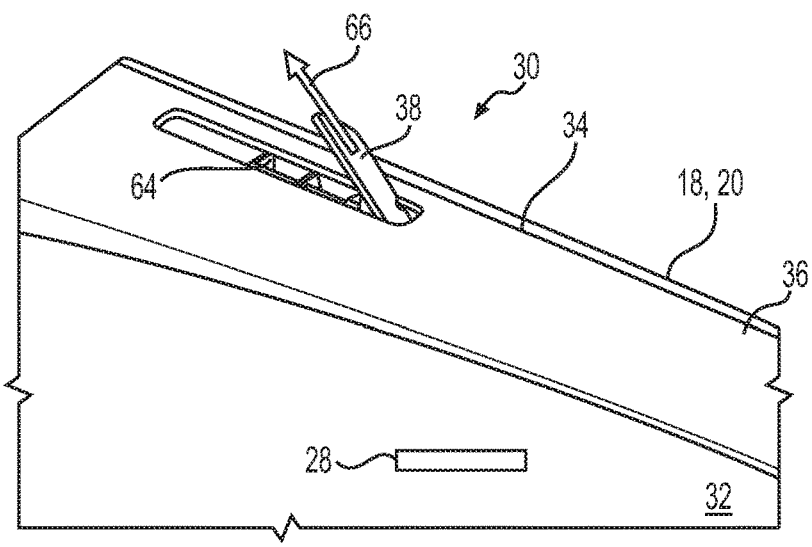
Figure 8:
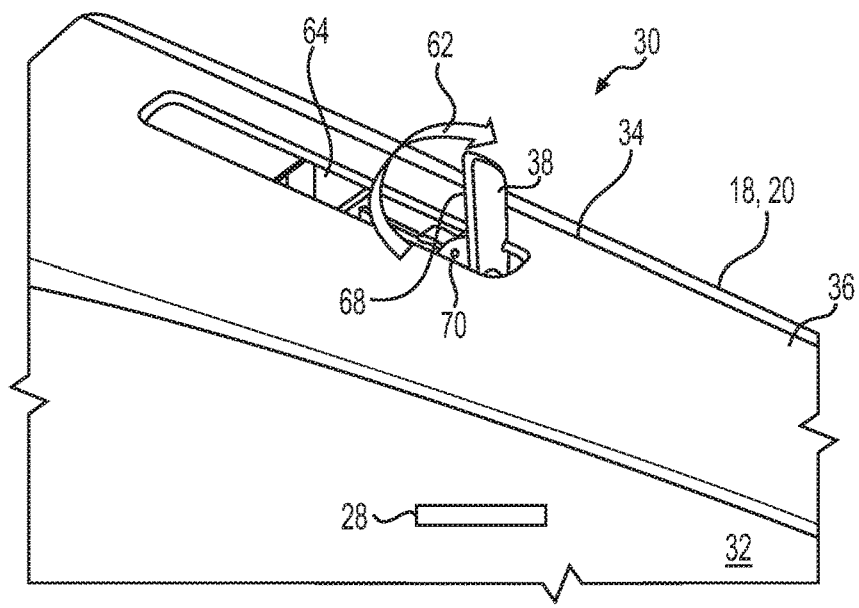

FIGS. 6-8 illustrate exemplary steps involved in manually actuating emergency release system 30. As shown in FIG. 6, the first step may be to lift a distal end of handle 38, thereby causing handle 38 to pivot forward in a direction represented by an arrow 62. In one embodiment, a finger may be inserted into a recessed space 64 at a distal end of handle 38, allowing the finger to push under the distal end and provide the upward force necessary to pivot handle 38.

Handle 38 may pivot in the direction of arrow 62 through a first range, until stop 60 (referring to FIG. 5) is engaged. In the disclosed embodiment, the first range may be about 25° to about 65° (e.g., about 40° to about 50° (e.g., about 45°). This pivot range may provide for sufficient space for the person activating actuating emergency release system 30 to wrap a hand around handle 38 in preparation for the next step in the activation process. In some embodiments, the pivoting of handle 38 through the first range may not correspond with a pivoting movement of cam 56 and/or pulling of cable 50. For example, an end of cable 50 may slip through a slot in cam 56 during this initial pivoting movement of handle 38, without any force being exerted on cable 50. In this manner, the pivoting of handle 38 through the first range may simply be a preliminary step that is required for actuation, but doesn't actually result in actuation.

As shown in FIG. 7, the second step may be performed after stop 60 has been engaged and further pivoting of handle 38 is thereby inhibited. Specifically, the second step may include the translating (e.g., pulling) of handle 38 in a direction away from pivot pin 58 and generally aligned with an arrow 66. By pulling handle 38 in this direction, stop 60 may be surmounted and subsequent pivoting of handle 38 may be possible.

As shown in FIG. 8, the third and final step may be performed after translation of handle 38 in the direction of arrow 66. In particular, the final step may include further pivoting of handle 38 in the direction of arrow 62 through a second range. In the disclosed embodiment, the second range may be about equal to the first range. For example, the second range may be about 25° to 65° (e.g., about 40° to about 50° (e.g., about 45°), such that handle 38 is generally pointing upward at about a 90° angle relative to upper surface 36. As handle 38 is pivoted through the second range, a corresponding pulling force may be exerted on cable 50. The second pivot range may provide for translation of cable 50 sufficient to remove the pawl from lever 44, thereby unlocking latch 42.

In some embodiments, a fluorescent surface 68 may be affixed to an underside of handle 38 (or another internal mechanism of action 48). In this manner, the activated status of handle 38 may be easily observed by someone inside and/or outside of automobile 10.

In some embodiments, it may be desirable to inhibit resetting of emergency release system 30. In particular, it could be possible for someone to exit automobile 10 via emergency release system 30 during an electrical power disruption and to subsequently close the corresponding door. Thereafter, if emergency release system were allowed to unintentionally reset, it would be difficult to regain entry to automobile 10 without breaking window 34 (assuming window 34 is closed at the time). For this reason, a reset blocking mechanism 70 may be provided that inhibits unintentional resetting of emergency release system 30. In the embodiment of FIG. 8, reset blocking mechanism 70 includes a spring-actuated pin located within a base of handle 38. Upon pivoting handle 38 to a fully activated and forward position, the pin may spring into a blocking position at which handle 38 is blocked from returning to its deactivated state. Handle 38 can still be returned to its deactivated state, but only after pushing the pin of reset blocking mechanism 70 back out of the way of handle 38.

It will be apparent to those skilled in the art that various modifications and variations can be made to the disclosed emergency release system and related method. Other embodiments will be apparent to those skilled in the art from consideration of the specification and practice of the disclosed emergency release system and related method. It is intended that the specification and examples be considered as exemplary only, with a true scope being indicated by the following claims and their equivalents.

What is claimed is:

1. An emergency release system for a side door of an automobile, the emergency release system comprising:
   a housing;
   a latch;
   a cable; and
   a handle mounted to the housing, the handle connected to the latch via the cable, the handle having an operation for releasing the latch via the cable,
   where the operation comprises the handle being pivotal about a pivot point in a first direction through a first range to abut a stop located on the housing, the handle being translatable in a second radial direction away from the pivot point in a manner to surmount the stop, and the handle being pivotal in the first direction through a second range after surmounting the stop to thereby release the latch.

2. The emergency release system of claim 1, wherein the first range is about 25° to about 65°.

3. The emergency release system of claim 2, wherein the first range is about 40° to about 50°.

4. The emergency release system of claim 3, wherein the second range is about the same as the first range.

5. The emergency release system of claim 1, further including a reset blocking mechanism configured to inhibit unintentional movement of the handle after the handle is pivoted through the second range.

6. The emergency release system of claim 1, further including a spring configured to provide resistance against movement of the handle.

7. The emergency release system of claim 1, wherein, when the handle is exposed to elevated forces, the handle is configured to break away from the side door with the cable remaining connected to the handle.

8. The emergency release system of claim 1, further including a pivot pin capable of connecting the handle to the side door.

9. The emergency release system of claim 8, wherein the pivot pin is configured to fail before failure of the handle when the handle is exposed to elevated forces.

10. The emergency release system of claim 1, further including a fluorescent surface operatively connected to a side of the handle that is visible only when the handle is in an actuated position.

* * * * *